United States Patent
Mantchev

(10) Patent No.: US 9,327,771 B2
(45) Date of Patent: May 3, 2016

(54) ADJUSTABLE VEHICLE TAILGATE DEVICE

(71) Applicant: Valentin Mantchev, Zionsville, IN (US)

(72) Inventor: Valentin Mantchev, Zionsville, IN (US)

( * ) Notice: Subject to any disclaimer, the term of this patent is extended or adjusted under 35 U.S.C. 154(b) by 0 days.

(21) Appl. No.: 14/457,973

(22) Filed: Aug. 12, 2014

(65) Prior Publication Data

US 2016/0046332 A1    Feb. 18, 2016

(51) Int. Cl.
  *B62D 33/08*    (2006.01)
  *B62D 25/00*    (2006.01)
  *B62D 33/027*    (2006.01)

(52) U.S. Cl.
  CPC .................................. *B62D 33/0273* (2013.01)

(58) Field of Classification Search
  CPC .... B29C 66/71; B29C 45/0081; B29C 65/08; B29C 65/48; B29C 65/58; B29C 66/1122; B29C 66/53461; B29C 66/712; B29C 66/73365; B29C 66/73921; B29K 2067/003; B29K 2069/00; B29K 2075/00; B29K 2067/006; B29K 2105/25; B29K 2995/0026; B60J 5/00; B60J 10/10; B60J 5/103; B60J 7/085; B60J 7/102; B60J 7/141; B60J 7/1856; B60J 7/201
  USPC ............. 296/51, 57.1, 100.07, 100.01, 180.4, 296/180.5, 24.43, 37.16, 52; 224/404, 519, 224/539, 148.6, 235, 309, 488; 414/462, 414/800, 809

See application file for complete search history.

(56) References Cited

U.S. PATENT DOCUMENTS

| | | | | |
|---|---|---|---|---|
| 3,065,869 A * | 11/1962 | Mathers et al. | ............... | 414/557 |
| 5,478,130 A * | 12/1995 | Matulin et al. | ............... | 296/57.1 |
| 5,685,594 A * | 11/1997 | Harper | ............................. | 296/51 |
| 6,364,391 B1 * | 4/2002 | Everett | ............................. | 296/51 |
| 6,874,838 B2 * | 4/2005 | De Gaillard | ..................... | 296/51 |
| 2001/0004155 A1 * | 6/2001 | Decker et al. | ................ | 296/57.1 |
| 2009/0309381 A1 * | 12/2009 | Nelson | ........................ | 296/26.11 |

\* cited by examiner

*Primary Examiner* — Jason S Morrow
*Assistant Examiner* — Sunsurraye Westbrook

(57) ABSTRACT

An adjustable vehicle tailgate device adjusts to multiple positions including pivoting both outwardly and inwardly to lay flat within the vehicle bed. The device includes a vehicle having a bed defined by a bottom wall and a pair of spaced sidewalls. A tailgate has a pair of opposite ends. Each of a pair of hinge pins extends from an associated opposite end of the tailgate proximate a bottom of the tailgate such that the tailgate is pivotable between the sidewalls. Each of a pair of latch pins extends from an associated opposite end of the tailgate proximate a top of the tailgate. Each latch pin engages an associated sidewall holding the tailgate in a static position. Each of the opposite ends of the tailgate is positioned in spaced relationship to an associated one of the sidewalls wherein the tailgate is pivotable inwardly towards the bed.

13 Claims, 4 Drawing Sheets

ADJUSTABLE VEHICLE TAILGATE DEVICE

BACKGROUND OF THE DISCLOSURE

Field of the Disclosure

The disclosure relates to tailgate devices and more particularly pertains to a new tailgate device for adjusting to multiple positions including pivoting both outwardly to extend from a vehicle bed and inwardly to lay flat within the vehicle bed.

SUMMARY OF THE DISCLOSURE

An embodiment of the disclosure meets the needs presented above by generally comprising a vehicle having a bed defined by a bottom wall and a pair of spaced sidewalls. A tailgate has a pair of opposite ends. Each of a pair of hinge pins extends from an associated opposite end of the tailgate proximate a bottom of the tailgate such that the tailgate is pivotable between the sidewalls. Each of a pair of latch pins extends from an associated opposite end of the tailgate proximate a top of the tailgate. Each latch pin engages an associated sidewall holding the tailgate in a static position. Each of the opposite ends of the tailgate is positioned in spaced relationship to an associated one of the sidewalls wherein the tailgate is pivotable inwardly towards the bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
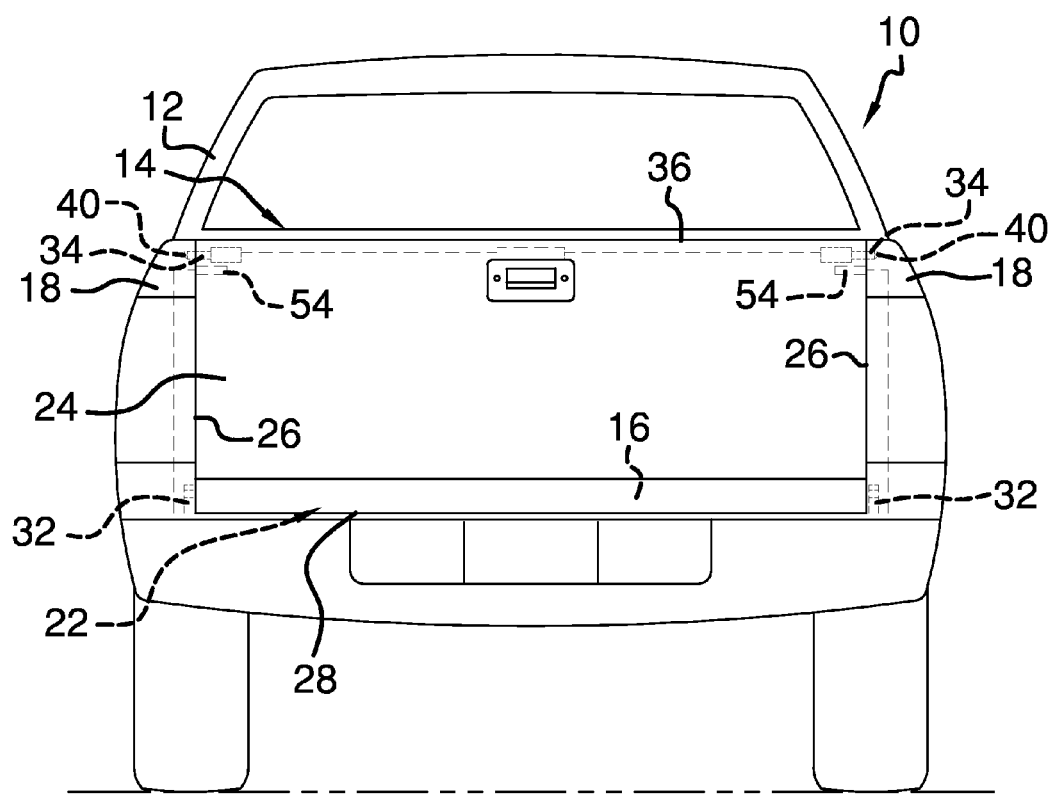
FIG. 1 is a back view of an adjustable vehicle tailgate device according to an embodiment of the disclosure.

With reference now to the drawings, and in particular to FIGS. 1 through 6 thereof, a new tailgate device embodying the principles and concepts of an embodiment of the disclosure and generally designated by the reference numeral 10 will be described.

Figure 2:
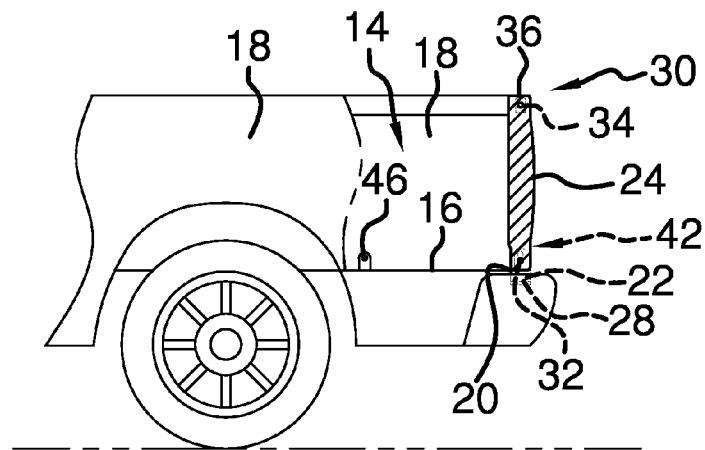
FIG. 2 is a partial cut-away side view of an embodiment of the disclosure in a closed position.

As best illustrated in FIGS. 1 through 6, the adjustable vehicle tailgate device 10 generally comprises a vehicle 12 having a bed 14 defined by a bottom wall 16 and a pair of spaced sidewalls 18. Each of the sidewalls 18 extends beyond a terminal edge 20 of the bottom wall 16. A well 22 is positioned at the terminal edge 20 of the bottom wall 16 relative to a cab of the vehicle 12. The well 22 extends between the sidewalls 18. A tailgate 24 has a pair of opposite ends 26. Each of the opposite ends 26 of the tailgate 24 is positioned in spaced relationship to an associated one of the sidewalls 18 such that the tailgate 24 is positionable between the sidewalls 18. A bottom 28 of the tailgate 24 is seated in the well 22 when the tailgate 24 is in a closed position 30 as shown in FIG. 2, wherein the tailgate 24 is substantially perpendicular to the bottom wall 16 and closing a distal end of the bed 14 relative to the cab of the vehicle 12.

As seen in FIGS. 2 through 6, various configurations are shown. It is to be understood that FIGS. 2 through 6 are representative of primarily one side of the device 10 but the device 10 is substantially symmetrical except as may be noted herein. Thus, FIGS. 2 through 6 provide an understanding of the device 10 as a whole as views of one side of the device 10 provide merely a mirror image of the elements on the opposite side of the device 10.

Each of a pair of hinge pins 32 is positioned to extend from an associated one of the opposite ends 26 of the tailgate 24 proximate the bottom 28 of the tailgate 24 such that the tailgate 24 is pivotable between the sidewalls 18. The hinge pins 32 may be statically secured or retractable in a conventional manner but are conventionally structured to allow for removal of the tailgate 24 from the vehicle 12. Each of a pair of latch pins 34 is positioned to extend from an associated one of the opposite ends 26 of the tailgate 24 proximate a top 36 of the tailgate 24. Each of the latch pins 34 is engageable to an associated one of the sidewalls 18 wherein the tailgate 24 is secured in a static position relative to the sidewalls 18. Each of the latch pins 34 is retractable into the tailgate 24 by manipulation of a handle 38 in a conventional manner such that the tailgate 24 is pivotable relative to the sidewalls 24. Each of the latch pins 34 has a frustrated conical outer section 40 relative to the tailgate 24. Each latch pin 34 may have a total length between 7.5 centimeters and 9.0 centimeters. Between 4.8 and 5.2 centimeters remain within the tailgate 24 when the latch pin 34 is in a fully extended position. The conical outer section 40 has a length between 0.5 and 0.8 centimeters.

Each of a pair of hinge slots 42 extends through an associated one of the sidewalls 18. Each of the hinge slots 42 is aligned with the well 22 such that a bottom section of each hinge slot 42 is positioned laterally from the well 22. Each of the hinge pins 32 extends into an associated one of the hinge slots 42. The bottom 28 of the tailgate 24 is movable out of the well 22 by sliding the hinge pins 32 upwardly towards a top 44 of the hinge slots 42 wherein the tailgate 24 is unobstructed by the terminal edge 20 of the bottom wall 16 and the tailgate 24 is free to pivot inwardly into the bed 14.

Figure 3:
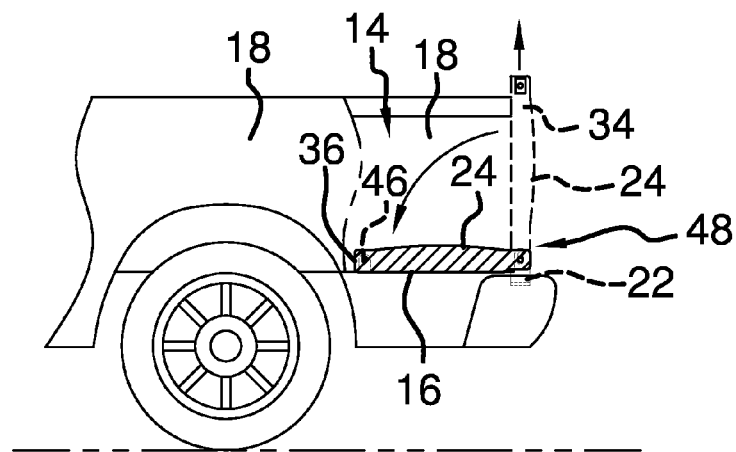
FIG. 3 is a partial cut-away side view of an embodiment of the disclosure in an inwardly pivoted position.

Each of a pair of holes 46 extends into an associated one of the sidewalls 18 such that each of the latch pins 34 is engageable to an associated one of the holes 46 while the tailgate 24 is pivoted inwardly into the bed 14. Each of the holes 46 is positioned proximate the bottom wall 16 wherein the tailgate 24 is substantially parallel to the bottom wall 16 when the tailgate 24 is in an inwardly pivoted position 48 as shown in FIG. 3. The tailgate 24 lays substantially flat on the bottom wall 16 when the tailgate 24 is in the inwardly pivoted position 48.

Figure 5:
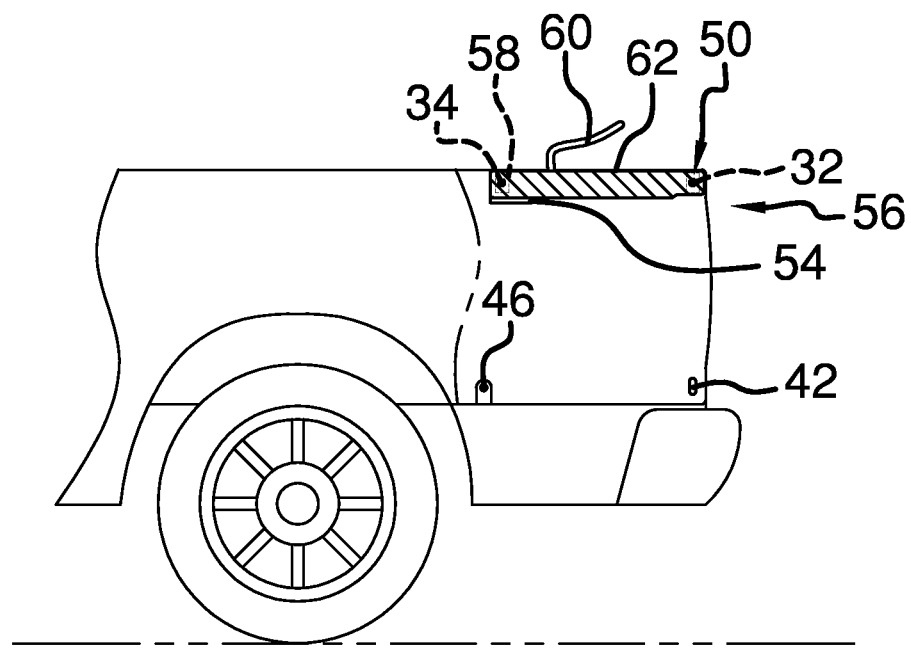
FIG. 5 is a partial cut-away side view of an embodiment of the disclosure in an alternative elevated position.
Figure 6:
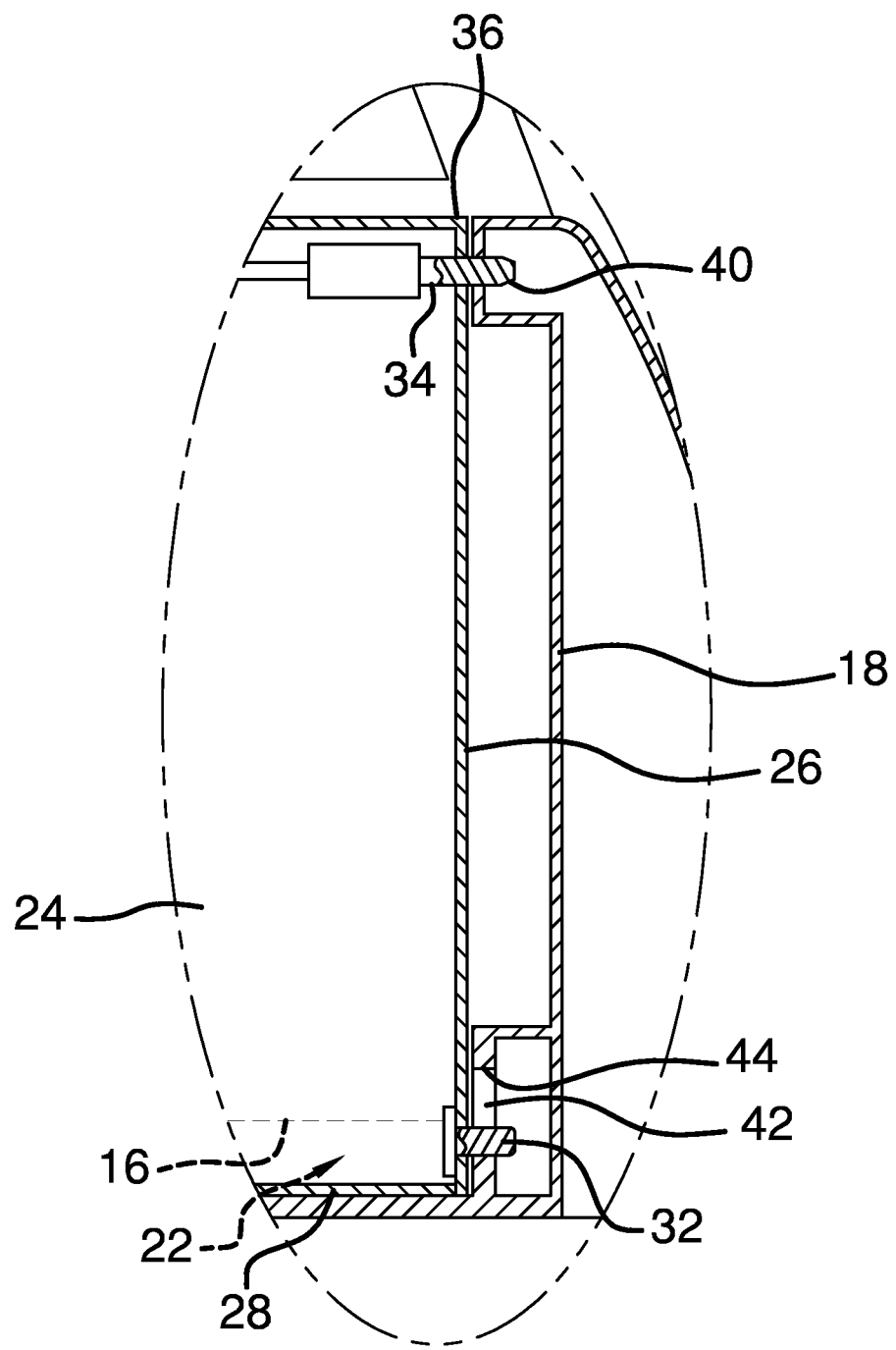
FIG. 6 is a partial cross-sectional view of an embodiment of the disclosure taken along line 6-6 of FIG. 2.

Each of a pair of apertures 50 extends into an associated one of the sidewalls 18 proximate a top 52 of the associated sidewall 18. Alternatively to positioning in the hinge slots 42, each of the hinge pins 32 is positionable within an associated one of the apertures 50 such that the tailgate 24 is pivotably coupled to the sidewalls 18. Each of a pair of supports 54 extends from an associated one of the sidewalls 18 inwardly into the bed 14. The supports 54 are spaced from the bottom wall 16. The tailgate 24 is pivotable to rest on the supports 54 such that the tailgate 24 is supported over the bottom wall 16 when the hinge pins 32 are engaged to the apertures 50 defining an elevated position 56. The tailgate 24 is positioned substantially parallel to the bottom wall 16 when the tailgate 24 is in the elevated position 56 as shown in FIG. 5. Each of a pair of sockets 58 extends into an associated one of the sidewalls 18 proximate an associated one of the supports 54. Each of the latch pins 34 is inserted into an associated one of the sockets 58 when the tailgate 24 is in the elevated position 56 to secure the tailgate 24 and hold the tailgate 24 in a static position relative to the sidewalls 18. A fin 60 may be coupled to an exterior surface 62 of the tailgate 24 such that the fin 60 is positioned to extend upwardly from the bed 14 when the tailgate 24 is in the elevated position 56.

Figure 4:
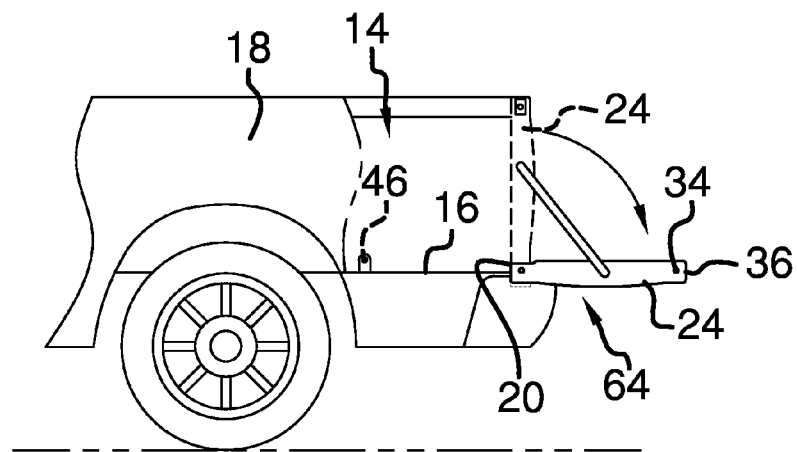
FIG. 4 is a partial cut-away side view of an embodiment of the disclosure in an open position.

In use, the tailgate 24 has multiple positions including being inwardly pivoted and secured to enhance aerodynamics of the vehicle 12 without the tailgate 24 being fully removed or extending rearwardly in an unsecured open position 64 as shown in FIG. 4.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable vehicle tailgate device comprising:
   a vehicle having a bed defined by a bottom wall and a pair of spaced sidewalls;
   a tailgate having a pair of opposite ends;
   a pair of hinge pins, each of said hinge pins being positioned to extend from an associated one of said opposite ends of said tailgate proximate a bottom of said tailgate such that said tailgate is pivotable between said sidewalls;
   a pair of latch pins, each of said latch pins being positioned to extend from an associated one of said opposite ends of said tailgate proximate a top of said tailgate, each of said latch pins being engageable to an associated one of said sidewalls wherein said tailgate is secured in a static position relative to said sidewalls; and
   wherein each of said opposite ends of said tailgate is positioned in spaced relationship to an associated one of said sidewalls wherein said tailgate is pivotable inwardly towards said bed to a position over said bottom wall.

2. The device of claim 1, further comprising:
   each of said sidewalls extending rearwardly from a terminal edge of said bottom wall; and
   a well positioned at said terminal edge of said bottom wall, said well extending between said sidewalls, said bottom of said tailgate being seated in said well when said tailgate is in a closed position.

3. The device of claim 2, further comprising a pair of hinge slots, each of said hinge slots extending through an associated one of said sidewalls, each of said hinge slots being aligned with said well, each of said hinge pins extending into an associated one of said hinge slots, said bottom of said tailgate being movable out of said well when said hinge pins are moved upwardly towards a top of said hinge slots wherein said tailgate is free to pivot inwardly into said bed.

4. The device of claim 1, further comprising a pair of holes, each of said holes extending into an associated one of said sidewalls such that each of said latch pins is engageable to an associated one of said holes while said tailgate pivoted inwardly into said bed.

5. The device of claim 4, further comprising each of said holes being positioned proximate said bottom wall wherein said tailgate is substantially parallel to said bottom wall when said tailgate is in an inwardly pivoted position.

6. The device of claim 5, further comprising said tailgate laying flat on said bottom wall when said tailgate is in said inwardly pivoted position.

7. The device of claim 1, further comprising each of said latch pins having a frustrated conical outer section relative to said tailgate.

8. The device of claim 7, further comprising each of said latch pins being retractable into said tailgate such that said tailgate is pivotable between said sidewalls.

9. The device of claim 1, further comprising:
   a pair of apertures, each of said apertures extending into an associated one of said sidewalls proximate a top of said associated sidewall;
   each of said hinge pins being positionable within an associated one of said apertures such that said tailgate is pivotably coupled to said sidewalls; and
   a pair of supports, each of said supports extending from an associated one of said sidewalls into said bed, said supports being spaced from said bottom wall, said tailgate being pivotable to rest on said supports such that said tailgate is supported over said bottom wall when said hinge pins are engaged to said apertures defining an elevated position.

10. The device of claim 9, further comprising said tailgate being positioned substantially parallel to said bottom wall when said tailgate is in said elevated position.

11. The device of claim 9, further comprising a pair of sockets, each of said sockets extending into an associated one of said sidewalls proximate an associated one of said supports, each of said latch pins being inserted into an associated one of said sockets when said tailgate is in said elevated position.

12. The device of claim 9, further comprising a fin coupled to an exterior surface of said tailgate such that said fin is positioned to extend upwardly from said bed when said tailgate is in said elevated position.

13. An adjustable vehicle tailgate device comprising:
   a vehicle having a bed defined by a bottom wall and a pair of spaced sidewalls, each of said sidewalls extending beyond a terminal edge of said bottom wall;

a tailgate having a pair of opposite ends, each of said opposite ends of said tailgate being positioned in spaced relationship to an associated one of said sidewalls;

a pair of hinge pins, each of said hinge pins being positioned to extend from an associated one of said opposite ends of said tailgate proximate a bottom of said tailgate such that said tailgate is pivotable between said sidewalls;

a pair of latch pins, each of said latch pins being positioned to extend from an associated one of said opposite ends of said tailgate proximate a top of said tailgate, each of said latch pins being engageable to an associated one of said sidewalls wherein said tailgate is secured in a static position relative to said sidewalls, each of said latch pins being retractable into said tailgate such that said tailgate is pivotable between said sidewalls, each of said latch pins having a frustrated conical outer section relative to said tailgate;

a well positioned at said terminal edge of said bottom wall, said well extending between said sidewalls, said bottom of said tailgate being seated in said well when said tailgate is in a closed position;

a pair of hinge slots, each of said hinge slots extending through an associated one of said sidewalls, each of said hinge slots being aligned with said well, each of said hinge pins extending into an associated one of said hinge slots, said bottom of said tailgate being movable out of said well when said hinge pins are moved upwardly towards a top of said hinge slots wherein said tailgate is free to pivot inwardly into said bed;

a pair of holes, each of said holes extending into an associated one of said sidewalls such that each of said latch pins is engageable to an associated one of said holes while said tailgate pivoted inwardly into said bed, each of said holes being positioned proximate said bottom wall wherein said tailgate is substantially parallel to said bottom wall when said tailgate is in an inwardly pivoted position, said tailgate laying flat on said bottom wall when said tailgate is in said inwardly pivoted position;

a pair of apertures, each of said apertures extending into an associated one of said sidewalls proximate a top of said associated sidewall, each of said hinge pins being positionable within an associated one of said apertures such that said tailgate is pivotably coupled to said sidewalls;

a pair of supports, each of said supports extending from an associated one of said sidewalls into said bed, said supports being spaced from said bottom wall, said tailgate being pivotable to rest on said supports such that said tailgate is supported over said bottom wall when said hinge pins are engaged to said apertures defining an elevated position, said tailgate being positioned substantially parallel to said bottom wall when said tailgate is in said elevated position;

a pair of sockets, each of said sockets extending into an associated one of said sidewalls proximate an associated one of said supports, each of said latch pins being inserted into an associated one of said sockets when said tailgate is in said elevated position; and a fin coupled to an exterior surface of said tailgate such that said fin is positioned to extend upwardly from said bed when said tailgate is in said elevated position.

\* \* \* \* \*